United States Patent [19]
Chander et al.

[11] Patent Number: 5,909,651
[45] Date of Patent: Jun. 1, 1999

[54] BROADCAST SHORT MESSAGE SERVICE ARCHITECTURE

[75] Inventors: Sharat Subramaniyam Chander, Woodridge, Ill.; Semyon B. Mizikovsky, Morganville, N.J.

[73] Assignee: Lucent Technologies Inc., Murray Hill, N.J.

[21] Appl. No.: 08/850,254

[22] Filed: May 5, 1997

Related U.S. Application Data

[60] Provisional application No. 60/023,049, Aug. 2, 1996.
[51] Int. Cl.⁶ ...................................................... H04Q 7/20
[52] U.S. Cl. .......................... 455/466; 455/458; 455/434; 455/515; 455/33.1; 370/259; 370/432; 370/312; 340/311.1; 340/825.44
[58] Field of Search ..................................... 455/458, 466, 455/434, 515; 370/432, 449, 458, 259, 312, 313, 314, 468, 56.1; 340/311.1, 825.44

[56] References Cited

U.S. PATENT DOCUMENTS

| | | | |
|---|---|---|---|
| 5,539,748 | 7/1996 | Raith | 370/95.1 |
| 5,603,081 | 2/1997 | Raith et al. | 455/33.1 |
| 5,604,744 | 2/1997 | Andersson et al. | 370/347 |
| 5,768,276 | 6/1998 | Diachina et al. | 370/432 |

OTHER PUBLICATIONS

TIA Standard IS–637, "Short Message Services For Wideband Spread Spectrum Cellular Systems".
TIA/EIA/IS–95–A, Mobile Station–Base Station Compatibility Standard for Dual–Mode Wideband Spread Spectrum Cellular System, pp. 1 through Appendix A ii.

*Primary Examiner*—Wellington Chin
*Assistant Examiner*—Isaak R. Jama
*Attorney, Agent, or Firm*—Martin I. Finston

[57] ABSTRACT

In certain wireless communication systems, including at least some CDMA cellular systems, short messages can be delivered to mobile stations in a broadcast fashion using a common forward (downlink) channel sometimes referred to as the Paging Channel. Economy in the use of the Paging Channel can be achieved by using so-called slotted mode reception. In accordance with this mode, the infrastructure directs messages to a given mobile station only during time slots allocated to the particular group of mobile stations to which the given station belongs. These time slots recur according to a paging slot cycle having a specified length (expressed as a number of slots), or slot cycle index. Disclosed here is a further cycle, referred to as the Broadcast Paging Cycle, for use in implementing a service for broadcasting short messages (to many mobile stations). The Broadcast Paging Cycle has an index that is larger than, and incommensurable with, the paging slot cycle index. Any given broadcast message is transmitted only once during each Broadcast Paging Cycle, in a predetermined slot thereof. This predetermined slot will eventually coincide, in a non-preferential manner, with each slot of the paging slot cycle. Consequently, the load on the Paging Channel due to the broadcast service will be averaged uniformly over all paging slots.

8 Claims, 3 Drawing Sheets

BROADCAST SHORT MESSAGE SERVICE ARCHITECTURE

CROSS REFERENCE TO RELATED APPLICATION

This application claims the priority of U.S. Provisional Application No. 60/023049, which was filed on Aug. 2, 1996.

FIELD OF THE INVENTION

The present invention relates to wireless communication systems. More particularly, it relates to systems for transmitting short textual messages.

BACKGROUND OF THE INVENTION

Some telecommunications service providers, including cellular and paging companies, provide a Short Message Service (SMS) for exchanging short alphanumeric messages between a mobile station and the wireless system, and between the wireless system and an external device able to transmit and, optionally, to receive such messages. Examples of such an external device are: a voice telephone, a data terminal, and a short message entry system.

For example, certain paging systems in current use can transmit, in a displayable message, a telephone number that the user is requested to call. Some wireless systems can transmit text for display on the screen of a wireless terminal. There also exist systems that can transmit alphanumeric text to computing devices such as desktop and laptop computers.

The Telecommunications Industry Association (CIA) has prescribed interim standards for transmitting short displayable messages over various wireless air interfaces and networks. Each of these standards is identified by the designation "IS-xxx", wherein "xxx" is a reference number. Each interim standard specifies a protocol, including operations, parameters, operational messages, and procedures for transmitting these short messages. For example, IS-95A, "Mobile Station-Base Station Compatibility Standard for Dual-Mode Wideband Spread Spectrum Cellular System," and IS-637, "Short Message Services for Wideband Spread Spectrum Cellular Systems," specify protocols for wireless systems that use Code Division Multiple Access (CDMA) technology.

The standard IS-637 defines a set of technical requirements for a SMS to deliver textual and numeric information for paging, messaging, and voice mail notification. The standards prescribed in IS-637 apply to mobile stations that operate in the analog mode, as well as to those that operate in the wideband spread spectrum CDMA mode. Because it is useful for an understanding of modes of operation of the present invention, IS-637 is hereby incorporated by reference.

Certain wireless communication systems, including at least some CDMA cellular and PCS systems, are designed in such a way that short messages can be delivered to mobile stations in a broadcast fashion. For example, CDMA systems have a common forward (downlink) control channel, also referred to as the Paging Channel. The Paging Channel is normally used for paging, for carrying system overhead information, and for control of mobile stations. However, this channel is also useful for delivery of short messages.

Any mobile station in the idle state, if it has selected a serving system in its locality area and is locked onto the Paging Channel, is continually processing all information that it is receiving from this channel.

Whereas information is often directed to specific mobile stations by setting particular addresses as part of transmitted messages, information of the overhead type is processed by all mobile stations. One messaging mechanism used to deliver information packages containing Short Message Service (SMS) information is Data Burst Message. This messaging mechanism is described in IS-95A, which is hereby incorporated by reference. One specific value of Address Type as a part of the Data Burst Message is the Broadcast Address. By specifying this address, the user can readily direct the message to every mobile station in the relevant coverage area that is on the Paging Channel and currently in the idle state.

Practitioners in the art of wireless communications have recognized a need to make mobile stations use electrical power more efficiently. For this purpose, so-called slotted mode reception has been implemented in wireless systems. In this mode, the mobile station receives information from the Paging Channel intermittently. The infrastructure directs messages to a given mobile station only during time intervals (slots) allocated to the particular group of mobile stations to which the given station belongs. The repetitive cycle of these time slots is defined as the Maximum Paging Slot Cycle. A parameter, referred to as the Slot Cycle Index, specifies this cycle. The Slot Cycle Index is transmitted in the overhead portion of the Paging Channel information block.

The architecture for the conventional use of the Paging Channel is described in the TIA standard IS-95A. One of the system overhead messages conventionally carried in the Paging Channel is the System Parameters Message. This message includes the index parameter which determines the length of the Paging Cycle.

With reference to FIG. 1, each mobile station needs to be awake (with respect to receiving information from the Paging Channel) only during its assigned active slot 10, plus the next adjacent slot 20, according to current practices. During the remainder of the Paging Slot Cycle, the mobile station may subsist in a power-conservation mode.

One way to define an active slot for a given mobile station is to calculate it from the mobile station ID. For example, the mobile station and the base station can readily use a common hashing function to calculate an active slot number from the mobile station ID. Hashing is particularly useful because it assures a relatively even load distribution among different slots on the Paging Channel. Hashing functions useful for this purpose are described in IS-95A.

A Broadcast SMS (B-SMS) message is readily sent to all mobile stations within the relevant coverage area by transmitting it in every paging slot. Thus each mobile station, when it awakens for its assigned paging slot, also receives the B-SMS message. However, this simple mechanism, which involves multiple repetitions of the same B-SMS message in every slot of the cycle, will quickly overload the paging channel and deny slot time to other messages that would otherwise be transmitted. Therefore, it would undesirably reduce the effective capacity of the Paging Channel.

SUMMARY OF THE INVENTION

We have invented a transmission mode that provides efficient delivery of B-SMS messages without a significant reduction of capacity on the Paging Channel.

Our invention uses a property of modular arithmetic. Suppose that each of a pair of cycles consists of an integer number of time slots, and that the respective integers are incommensurable (that is, they lack a common divisor other than 1). Suppose further that the two cycles run at the same rate; i.e., at the same time interval per slot, and that initially, the first slot of one cycle coincides with the first slot of the other cycle. In such a case it is readily proven, among other things, that the first slot of the longer cycle will coincide, just once, with each slot of the shorter cycle (after slot 1) before it again coincides with slot 1.

As noted above, a Maximum Paging Slot Cycle determines the limited time interval during which a given mobile station must be awake to receive incoming Paging Channel information. In accordance with our invention, we define an additional cycle, which we refer to as the Broadcast Paging Cycle. The duration of the Broadcast Paging Cycle (expressed as an integer number of slots) is greater than the duration of the Maximum Paging Slot Cycle, and the respective durations are incommensurable.

Any given B-SMS message is transmitted only once during each Broadcast Paging Cycle, in a predetermined slot of that cycle. Because the predetermined slot will eventually coincide, in a non-preferential manner, with each slot of the Maximum Paging Slot Cycle, the resulting load on the Paging Channel will be averaged uniformly over all paging slots.

Significantly, mobile stations equipped to receive B-SMS messages will readily be synchronized with the cycle of B-SMS transmissions so that they wake up not only for their assigned slot of the Maximum Paging Slot Cycle, but also for the relevant slot of the Broadcast Paging Cycle.

DETAILED DESCRIPTION

In an exemplary embodiment of the invention, the Broadcast Paging Cycle has a duration of B+3 slots. B is defined by the following expression, in which the Broadcast Index parameter i is an integer at least 1 and not more than 7:

$$B = 2^i \times 16, \ 1 \leq i \leq 7.$$

A convenient symbolic representation for the Broadcast Index parameter, which will be used below, is BCAST_INDEX$_S$. It is advantageous to specify the index parameter for the Maximum Paging Slot Cycle as the default value for BCAST_INDEX$_S$. However, BCAST_INDEX$_S$ is preferably made much larger than the Maximum Paging Slot Cycle, because broadcast messages will typically be sent much less frequently than paging messages and mobile station control messages.

The value of BCAST_INDEX$_S$ is advantageously sent by the wireless system to the mobile station as part of a package of information referred to as the Extended System Parameters Message, which according to conventional practices is optionally carried in the Paging Channel in addition to the System Parameters Message. The length of the Broadcast Paging Cycle, and thus the value of BCAST_INDEX$_S$, can be chosen by a system operator according to the desired periodicity with which broadcast SMS messages are to be transmitted. A failure by the wireless system to send the Extended System Parameters Message is one instance that will cause BCAST_INDEX$_S$ to assume its default value.

By way of illustration, if B is the size of the Maximum Paging Slot Cycle (the default condition mentioned above), the first B-SMS slot will coincide with the first Paging slot. In this case, the first slot of each broadcast paging cycle is any Paging Channel slot in which $$\left[\frac{t}{4}\right] \bmod (B + 3) = 0,$$

where t represents system time in frames. (According to current practice, each slot is composed of four so-called half-frames, each typically of 10 ms duration.)

Figure 1:
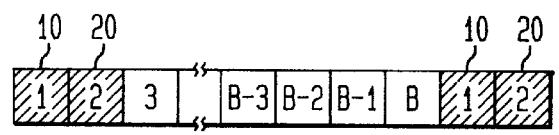
FIG. 1 schematically depicts a full conventional paging cycle of length B, followed by part of a second such cycle.
Figure 2:
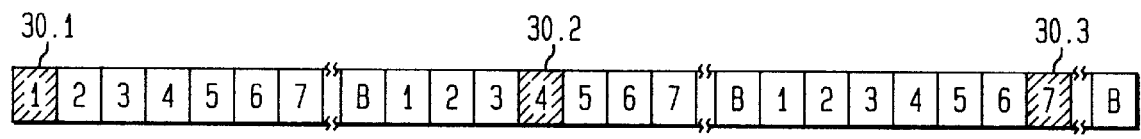
FIG. 2 schematically depicts a superposition of a broadcast cycle of length B+3 on a sequence of paging cycles of the kind illustrated in FIG. 1.
Figure 3:
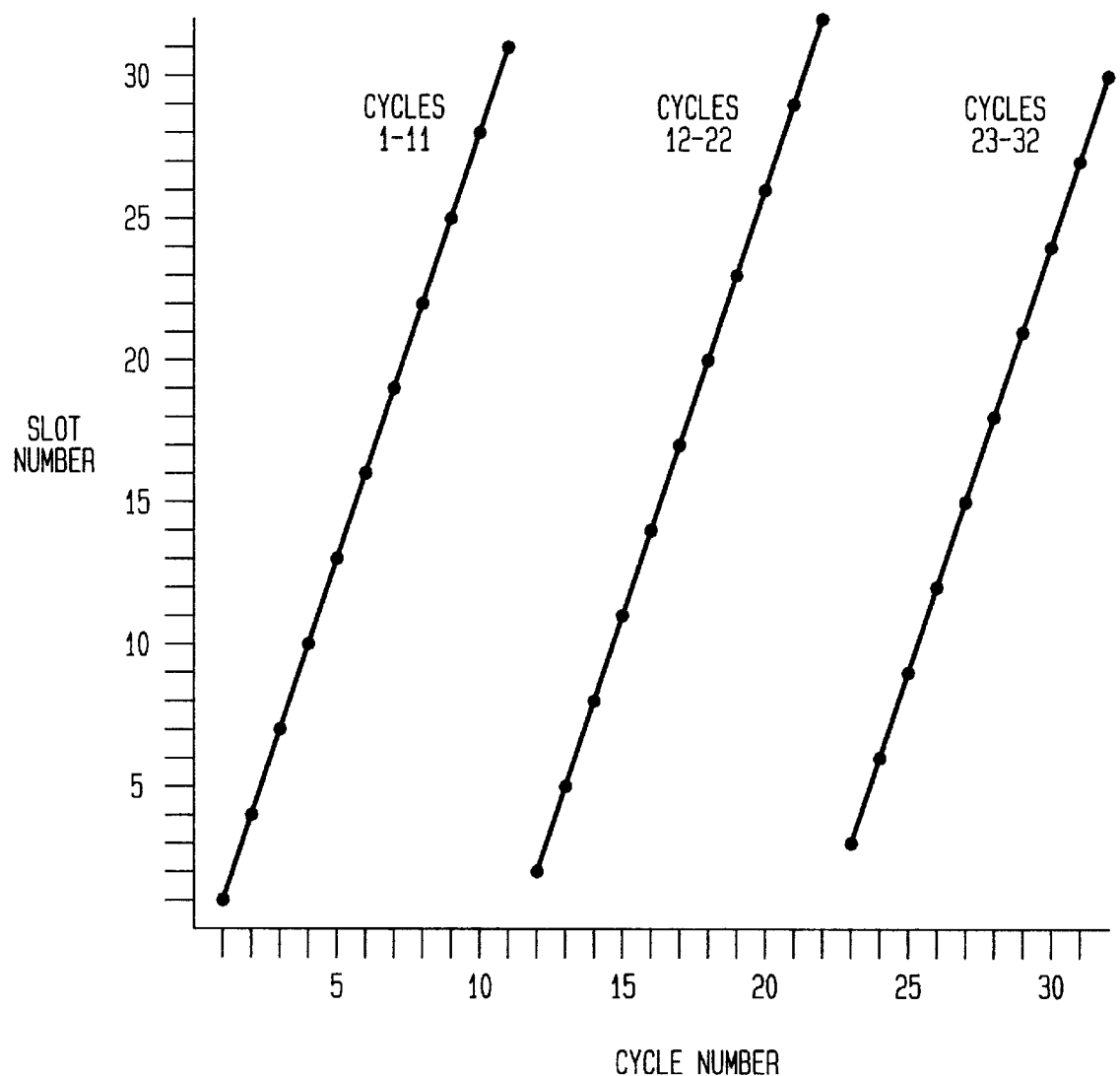
FIG. 3 illustrates how the position taken in the paging cycle by the first broadcast slot advances through the cycle in the case where B=32 and the length of the broadcast cycle is B+3=35. A sequence of 32 paging cycles is indexed by cycle number on the horizontal access. The slot of each respective cycle in which the first broadcast slot falls is indexed on the vertical axis.

As shown in FIG. 2, each succeeding B-SMS slot 30.1, 30.2, etc., will advance three positions relative to the Paging Slot Cycle. Thus, the next B-SMS slot will be slot 4 (i.e., 1+3) of the next paging cycle, the next thereafter will be slot 7 (i.e., 4+3) of the following cycle, etc. Eventually, all paging slots will be "hit" by the B-SMS, and the load on the Paging Channel will be averaged for all paging slots. This averaging behavior is illustrated by FIG. 3.

Any mobile station equipped for receiving B-SMS messages will be readily synchronizable with the cycle of B-SMS transmissions by using, for example, information contained in the Extended System Parameters Message, which is sent in the paging channel.

Examples of broadcast messages are emergency announcements, automobile traffic reports, commercial advertisements, stock market quotations, and public service announcements. A given mobile station may be configured to receive some, all, or none of the various categories of broadcast service. The Broadcast Service Category is identified in one of the parameters packaged in the header information that is delivered with each broadcast message. Based on this parameter, the mobile station either accepts or rejects the incoming message, depending on how the mobile station has been configured.

Figure 4:
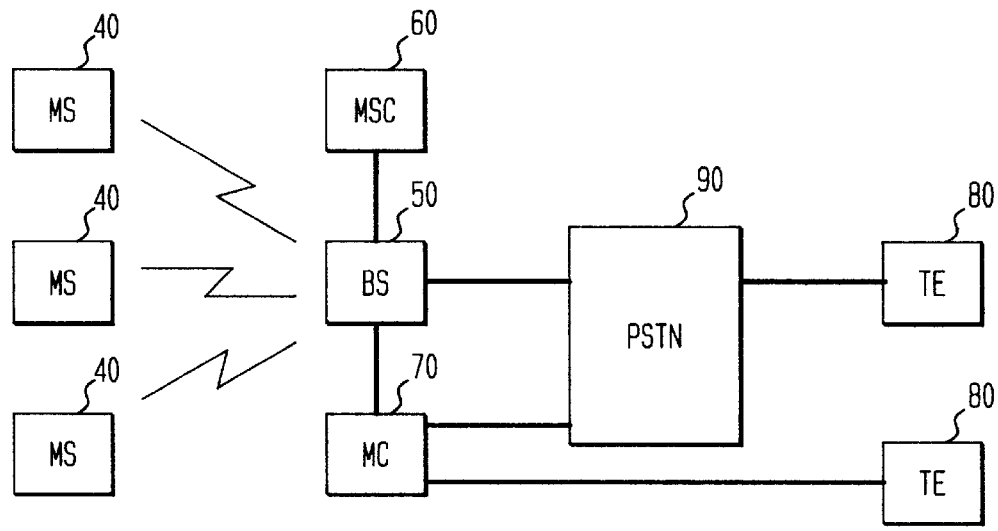
FIG. 4 is a schematic block diagram of an illustrative network of the prior art for wireless communication.

In the illustrative wireless communication network of FIG. 4, each mobile station 40 communicates over the air interface with base station 50. Network connections are set up by mobile switching center (MSC) 60. Broadcast messages are assembled at Message Center 70. Voice or data terminal equipment 80 affords communicative access to the Message Center directly, or via the public switched telephone network 90. The Message Center sends each new broadcast message to one or more Mobile Switching Centers (MSCs). Each MSC sends the message to its associated base stations. Each base station broadcasts the message over the air interface to the mobile stations in its area of coverage.

Figure 5:
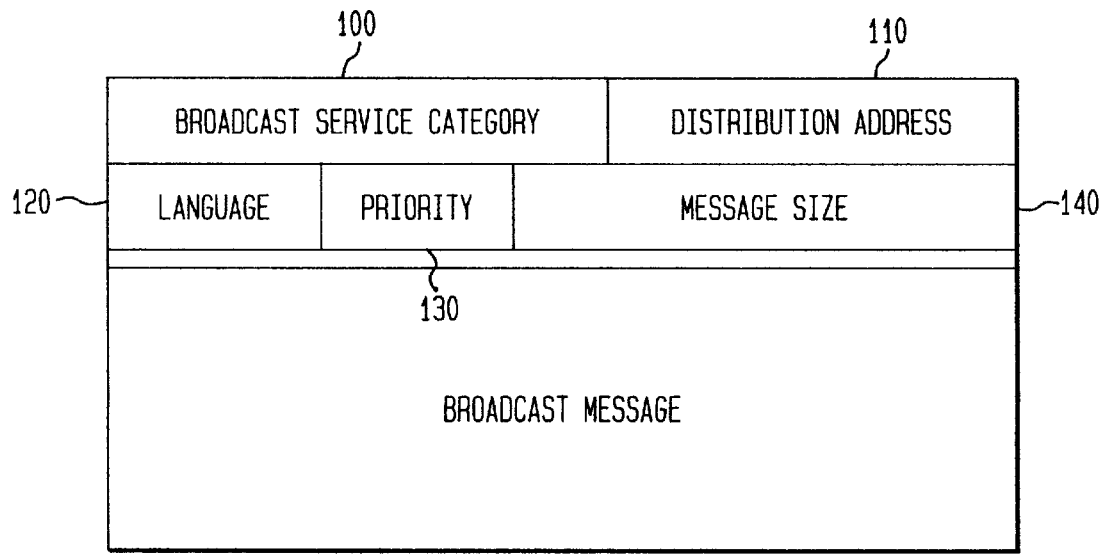
FIG. 5 is a schematic representation of a broadcast message having header information appended to it.

As originated in the Message Center, each broadcast message contains header information. Some useful header information is summarized in FIG. 5. As noted, this information includes a parameter 100 to identify the Broadcast Service Category. The header information also includes a distribution address 110, which instructs the MSC where to send the message. The header information may also include a parameter 120 indicating the language in which the message is being sent.

The header information may also include a parameter 130 identifying the priority of the message. This parameter is especially advantageous in the case of emergency messages. That is, the MSC can select a higher priority message for transmission instead of the next pending message in a given broadcast slot. Since only one slot of the Broadcast Paging Cycle can be occupied by the broadcast message, this provision is desirable for assuring that emergency information will be delivered promptly.

The header information also includes a message size parameter 140 that informs the mobile station how long the message is. This information enables the mobile station to stay awake just long enough to receive the entire broadcast message before returning to an energy-conserving "sleep" state. (It will be understood that the "awake" and "sleep" states discussed here are with specific reference to reception of broadcast messages in the Paging Channel, and do not refer to any other activities of the mobile station.)

The duration of a given broadcast message may be any length up to a prearranged limiting number of time slots. Such a limiting number is desirable because broadcast messages will generally drain energy not only from those mobile stations that are configured to receive them, but also from those mobile stations that are not so configured. A limit on the length of the broadcast messages will limit the drain on non-receiving mobile stations.

A currently preferred limiting number is three. This number represents a practical compromise between the above-described objective, and the need to accommodate broadcast messages of reasonable size.

According to a currently preferred embodiment, broadcast messages are limited to a maximum of three consecutive slots, and all other messages on the Paging Channel are limited to a maximum of two consecutive slots. Message-assembly rules are implemented at the Message Center to enforce these limits. If a broadcast message received by a mobile station remains uncompleted at the end of the third slot, the mobile station will discard the message as faulty, and (because a faulty message may indicate loss of synchronization) will then initiate a procedure for restoring synchronization with the Paging Channel.

Further economy can be achieved by indicating to the mobile station when there are no broadcast messages to receive. One method for doing this is described in the TIA standards publication IS-95-A, "Mobile Station-Base Station Compatibility Standard for Dual-Mode Wideband Spread Spectrum Cellular System," hereby incorporated by reference. As described in IS-95-A, the General Page message (usually the first message in the first Broadcast slot) contains a field denoted "BDCST_DONE". If a mobile station wakes up solely to receive a broadcast message and encounters a "1" in this field, it will promptly go back to sleep. On the other hand, if a broadcast message is to be sent, it must begin either in the first or the next following slot (and, as noted, must end no later than the end of the third slot).

As explained above, the Broadcast Paging Cycle (referred to more concisely as the Broadcast Cycle) is longer than, and incommensurable with, the Maximum Paging Slot Cycle (referred to more concisely as the Paging Cycle). The result of this is that each mobile station wakes up not only once during each Paging Cycle, but also once during each Broadcast Cycle. (If the two respective cycles coincide, then, effectively, the wake time is dictated by a single cycle. Even if the cycles do not coincide, their incommensurability dictates that there will be occasions when the wake-up frame of one cycle coincides with the wake-up frame of the other cycle.) The wake-up frame of the Broadcast Cycle is the same for all mobile stations. Illustratively, this frame is the first frame of the cycle.

Both the Paging Cycle and the Broadcast Cycle are synchronized to System Time, which is provided by the wireless system in the form of synchronization messages. The currently preferred procedures for synchronization are described in IS-95.

The facility to send broadcast messages according to the broadcast cycle resides in the MSC and/or in the base station, depending on the specific implementation of the wireless system.

The invention claimed is:

1. In a wireless communication network adapted for slotted mode transmission of messages to receiving stations, wherein a paging cycle consisting of a positive integer B of slots is defined, and a message destined for a particular receiving station or group of receiving stations must begin within a respective slot assigned to such station or group of stations,
   a method for transmitting at least one broadcast message to the receiving stations, the method comprising transmitting the broadcast message in accordance with a further slot cycle, to be referred to as the broadcast cycle, wherein:
      the broadcast message must begin within a specified portion of the broadcast cycle;
      the broadcast cycle consists of a positive integral number B+N of slots;
      B+N is greater than B; and
      B+N is incommensurable with B, whereby occurrences of the specified portion of the broadcast cycle tend to be distributed uniformly over the respective slots of the paging cycle.

2. In a receiving station in communicative contact with a wireless communication network adapted for slotted mode transmission of messages to receiving stations, wherein a paging cycle consisting of a positive integer B of slots is defined, and a message destined for a particular receiving station or group of receiving stations must begin within a respective slot assigned to such station or group of stations,
   a method for receiving at least one broadcast message from the network, the method comprising maintaining a further slot cycle, to be referred to as the broadcast cycle, and periodically awakening from a quiescent state in accordance with said cycle for receiving the broadcast message, wherein:
      the broadcast message is received only if it begins within a specified portion of the broadcast cycle;
      the broadcast cycle consists of a positive integral number B+N of slots;
      B+N is greater than B; and
      B+N is incommensurable with B, whereby occurrences of the specified portion of the broadcast cycle tend to be distributed uniformly over the respective slots of the paging cycle.

3. The method of claim 1 or claim 2, wherein B is equal to (2 raised to the power i) times 16, and i is a positive integer at least 1 but not more than 7.

4. The method of claim 1 or claim 2, wherein N is equal to 3.

5. The method of claim 1 or claim 2, wherein the specified portion of the broadcast cycle comprises a specified slot thereof.

6. The method of claim 1 or claim 2, wherein the specified portion of the broadcast cycle consists of a specified slot thereof and the following adjacent slot.

7. The method of claim 1 or claim 2, wherein the specified portion of the broadcast cycle comprises the first slot thereof.

8. The method of claim 1 or claim 2, wherein the specified portion of the broadcast cycle consists of the first and second slots thereof.

* * * * *